(12) United States Patent
Kalos et al.

(10) Patent No.: US 9,940,065 B2
(45) Date of Patent: *Apr. 10, 2018

(54) SYSTEMS AND METHODS FOR MIGRATING DATA

(71) Applicant: INTERNATIONAL BUSINESS MACHINES CORPORATION, Armonk, NY (US)

(72) Inventors: Matthew J. Kalos, Tucson, AZ (US); Steven E. Klein, Tucson, AZ (US); Jared M. Minch, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/399,075

(22) Filed: Jan. 5, 2017

(65) Prior Publication Data

US 2017/0115929 A1 Apr. 27, 2017

Related U.S. Application Data

(63) Continuation of application No. 15/015,399, filed on Feb. 4, 2016, now Pat. No. 9,588,712, which is a (Continued)

(51) Int. Cl.
| | |
|---|---|
| G06F 3/06 | (2006.01) |
| H04L 29/08 | (2006.01) |
| G06F 11/10 | (2006.01) |
| G06F 21/78 | (2013.01) |
| H04L 29/06 | (2006.01) |

(52) U.S. Cl.
CPC .......... *G06F 3/0647* (2013.01); *G06F 3/0604* (2013.01); *G06F 3/065* (2013.01); *G06F 3/0607* (2013.01); *G06F 3/067* (2013.01); *G06F 3/0619* (2013.01); *G06F 3/0623* (2013.01); *G06F 3/0644* (2013.01); *G06F 3/0661* (2013.01); *G06F 3/0665* (2013.01); *G06F 3/0683* (2013.01); *G06F 3/0689* (2013.01); *G06F 11/1004* (2013.01); *G06F 21/78* (2013.01); *H04L 29/08* (2013.01); *H04L 63/0428* (2013.01)

(58) Field of Classification Search
CPC .... G06F 3/0647; G06F 3/0619; G06F 3/0623; G06F 3/065; G06F 3/0665; G06F 3/067; G06F 3/0683; G06F 11/1004
See application file for complete search history.

(56) References Cited

U.S. PATENT DOCUMENTS

| | | |
|---|---|---|
| 2003/0236953 A1 | 12/2003 | Grieff et al. |
| 2005/0071372 A1 | 3/2005 | Bartfai et al. |
| | (Continued) | |

FOREIGN PATENT DOCUMENTS

CN 1773464 A 5/2006

*Primary Examiner* — Ryan Bertram
(74) *Attorney, Agent, or Firm* — Griffiths & Seaton PLLC

(57) ABSTRACT

Various embodiments provide computer program products for migrating data. One embodiment comprises receiving, from a first processor, data that is unprotected comprising a data integrity field; utilizing, by a second processor, a peer-to-peer remote copy (PPRC) application to add protection to the data to generate protected data; and subsequent to adding the protection, modifying a value in the data integrity field such that the value is different than an industry standard default value for protected data subsequent to adding the protection.

10 Claims, 5 Drawing Sheets

Related U.S. Application Data continuation of application No. 14/636,799, filed on Mar. 3, 2015, now Pat. No. 9,292,214, which is a continuation of application No. 13/451,701, filed on Apr. 20, 2012, now Pat. No. 8,996,828.

(56) References Cited

U.S. PATENT DOCUMENTS

| | | |
|---|---|---|
| 2006/0098818 A1 | 5/2006 | Fifer et al. |
| 2007/0294493 A1 | 12/2007 | Buah et al. |
| 2008/0049505 A1 | 2/2008 | Kim et al. |
| 2009/0182961 A1 | 7/2009 | Astigarraga et al. |

SYSTEMS AND METHODS FOR MIGRATING DATA

CROSS-REFERENCE TO RELATED APPLICATION

This application is a Continuation of U.S. patent application Ser. No. 15/015,399, filed on Feb. 4, 2016, which is a Continuation of U.S. patent application Ser. No. 14/636,799, filed on Mar. 3, 2015 that is now U.S. Pat. No. 9,292,214, which is a Continuation of U.S. patent application Ser. No. 13/451,701, filed Apr. 20, 2012 that is now U.S. Pat. No. 8,996,828, the entire contents of which are incorporated herein by reference and is relied upon for claiming the benefit of priority.

BACKGROUND OF THE INVENTION

Field of the Invention

The present invention relates generally to computing systems, and more particularly to, systems and methods for migrating data from an unprotected small computer system interface logical unit number (SCSI LUN) to a protected SCSI LUN and migrating data from a protected SCSI LUN to an unprotected SCSI LUN utilizing a peer-to-peer remote copy (PPRC) application.

Description of the Related Art

The T10 small computer system interface (SCSI) standard defines a DIF information model where a SCSI block device may be formatted with a data integrity field (DIF) associated with each logical block. The DIF provides end-to-end protection and verification of the integrity of the data from the time that the SCSI host initially writes the data.

A block device that is formatted without DIF information is referred to as including type 0 protection. A block device formatted with DIF information is referred to as including type 1 protection and includes a block cyclic redundancy check (CRC), a reference tag (LBA), and an application-defined application tag.

As support for T10 DIF emerges, it is desirable to migrate data from existing volumes that have type 0 protection (i.e., do not include type 1 protection) to volumes that are formatted with type 1 protection. Current systems and methods for performing this type of data migration typically utilize a SCSI host to perform the data migration. Specifically, the SCSI host reads all of the blocks of data from the unprotected volume, formats the blocks of data with DIF information, and then writes the blocks of data along with the DIF information to the new volume. In other words, the SCSI host is responsible for performing each of the tasks related to migrating data between volumes.

SUMMARY OF THE INVENTION

Various embodiments provide computer program products for migrating data. One embodiment comprises receiving, from a first processor, data that is unprotected comprising a data integrity field; utilizing, by a second processor, a peer-to-peer remote copy (PPRC) application to add protection to the data to generate protected data; and subsequent to adding the protection, modifying a value in the data integrity field such that the value is different than an industry standard default value for protected data subsequent to adding the protection.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide systems and methods for migrating data. One system comprises a small computer system interface logical unit number (SCSI LUN) configured to store protected data, a processor, and memory coupled to the processor. The memory is configured to store a peer-to-peer remote copy (PPRC) application, wherein the processor is configured to check a block cyclic redundancy check (CRC) for the protected data when the processor receives a request to read the protected data.

Other embodiments provide methods for migrating unprotected data to a protected SCSI LUN. One method comprises receiving unprotected data from a first processor. The method further comprises utilizing, by a second processor, a PPRC application to add protection to the data to generate protected data, checking a block cyclic redundancy check (CRC) for the protected data when the processor receives a request to read the protected data, and storing the protected data in a protected SCSI LUN.

Figure 1:
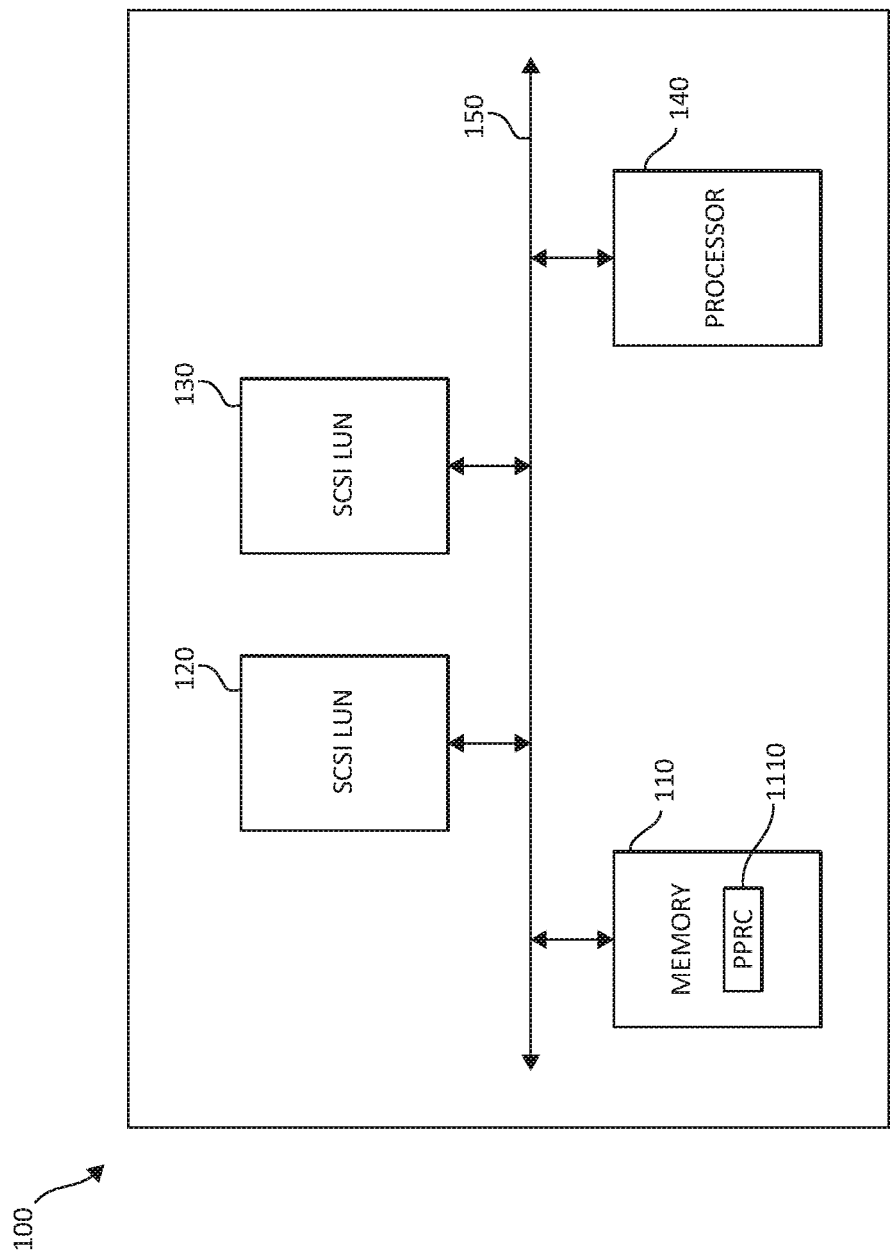
FIG. 1 is a block diagram of one embodiment of a system for migrating data.

Turning now to the figures, FIG. 1 is a block diagram of one embodiment of a system 100 for migrating data. At least in the illustrated embodiment, system 100 comprises a memory 110, a SCSI LUN 120 comprising unprotected data, a SCSI LUN 130 comprising protected data, and a processor 140 coupled to one another via a bus 150 (e.g., a wired and/or wireless bus).

Memory 110 may be any memory system and/or device capable of storing a peer-to-peer remote copy (PPRC) application 1110. PPRC 1110, in one embodiment, is a protocol (e.g., computer-executable code) utilized to mirror a first SCSI LUN (e.g., a source volume) to a second SCSI LUN (e.g., a target volume).

SCSI LUN 120 may be any memory system and/or block device capable of storing data. In one embodiment, SCSI LUN 120 comprises unprotected data. In other words, SCSI LUN 120 is formatted without DIF information (e.g., includes type 0 protection). The unprotected data in SCSI LUN 120 is capable of being transmitted to SCSI LUN 130 utilizing PPRC application 1110.

SCSI LUN 130 may be any memory system and/or device capable of storing data. In one embodiment, SCSI LUN 130 comprises protected data. In other words, SCSI LUN 130 is formatted with DIF information (e.g., includes type 1 protection). Data stored in SCSI LUN 130 includes a data integrity field (DIF) that includes a block cyclic redundancy check (CRC), a reference tag (LBA), and an application-defined application tag. The protected data in SCSI LUN 130 is capable of being transmitted to SCSI LUN 120 utilizing PPRC application 1110.

Processor 140 may be any system, device, and/or device capable of executing PPRC application 1110 in the background to migrate (e.g., mirror) data between SCSI LUN 120 and SCSI LUN 130. In one embodiment, processor 140 is configured to migrate unprotected data from SCSI LUN 120 to SCSI LUN 130. Specifically, processor 140 is configured to utilize PPRC application 1110 to convert the unprotected data to protected data and store the protected data in SCSI LUN 130. In other words, processor 140 is configured to utilize PPRC application 1110 to add type 1 protection to the data and store the data with type 1 protection in SCSI LUN 130.

When migrating data from SCSI LUN 120 to SCSI LUN 130, processor 140 is configured to determine from the small computer system interface command descriptor block (SCSI CDB) that the data being migrated from SCSI LUN 120 is not formatted with type 1 protection and that the write command is addressed to a volume that that is formatted with type 1 protection (i.e., SCSI LUN 130). In response thereto, processor 140 is configured to generate DIF information on the logical blocks of the data as the blocks are being written into SCSI LUN 130. The DIF information generated will have good block CRC, a reference tag, and an application tag set to the industry standard "FFFFh", which indicates that the validity of the DIF should not be checked.

When type 1 protection with a valid application tag is generated, then the integrity of the data from the time that the DIF information was generated on SCSI LUN 130 is ensured. When a host reads the data on SCSI LUN 130, a valid DIF on the logical blocks ensures that the data was not corrupted after the data was written to SCSI LUN 130.

In an alternative embodiment, processor 140 is configured to provide an interface that enables a user to select a value to use for the application tag, rather than "FFFFh." An application tag that is not FFFFh indicates that the validity of the DIF should be checked and allows a user to check the validity of the data stored in SCSI LUN 130. In other words, enabling a user to define and/or select an application tag that is different than FFFFh (i.e., an application tag that is different than the industry standard default application tag), allows the user to check the CRC of the data subsequent to reading the data from SCSI LUN 130.

In another embodiment, processor 140 is configured to migrate data from SCSI LUN 130 (i.e., from a volume formatted with type 1 protection) to SCSI LUN 120 (i.e., to a volume that does not include type 1 protection). That is, SCSI LUN 130 has support for the data transformation, while SCSI LUN 120 does not support the data transformation.

To perform the data migration, processor 140 is configured to determine if the receiving SCSI LUN (i.e., SCSI LUN 120) is formatted with DIF information. This determination is made when a relationship between SCSI LUN 120 and SCSI LUN 130 is first established. Specifically, SCSI LUN 130 issues a query to SCSI LUN 120 to determine the state of SCSI LUN 120. In response to the query, SCSI LUN 120 transmits a response that includes a flag that indicates whether or not the secondary volume is formatted with DIF information (i.e., a flag that indicates that SCSI LUN 120 is not formatted with type 1 protection) and SCSI LUN 130 stores this information. When data is transferred from SCSI LUN 130 to SCSI LUN 120, processor 140 is configured to strip the type 1 protection from the logical blocks being transmitted from SCSI LUN 130 to SCSI LUN 120 prior to transmitting the data to SCSI LUN 120.

The following sequence is illustrative of the operation of this embodiment of system 100. Initially, processor 140 determines that it is necessary to issue a command to write data from SCSI LUN 130 to SCSI LUN 120. Processor 140 then determines that SCSI LUN 130 is formatted with type 1 protection and that SCSI LUN 120 is not formatted with type 1 protection. Processor 140 is then configured to strip the type 1 protection from the logical blocks and then transfer the logical blocks to SCSI LUN 120. Furthermore, processor 140 then strips the DIF from the blocks as processor 140 reads the data from SCSI LUN 130 and then sends a SCSI write command with the data to SCSI LUN 120.

Although FIG. 1 illustrates system 100 as comprising one unprotected SCSI LUN (e.g., SCSI LUN 120) and one protected SCSI LUN (SCSI LUN 130), system 100 is not limited to such. That is, various embodiments of system 100 may include more than one unprotected SCSI LUN (e.g., SCSI LUN 120) and/or more than one protected SCSI LUN (SCSI LUN 130) and function similar to the illustrated embodiment of system 100.

Figure 2:
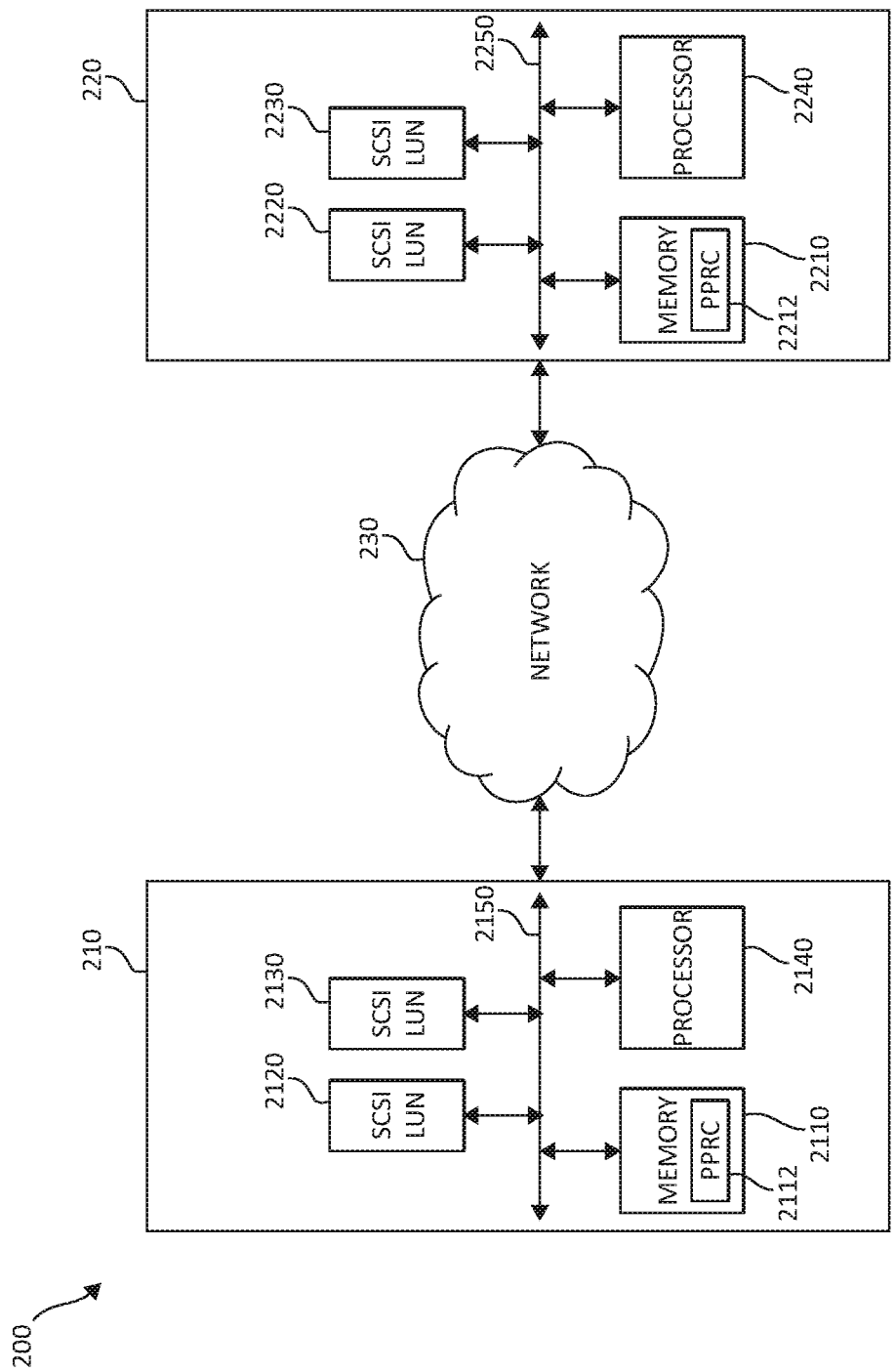
FIG. 2 is a block diagram of another embodiment of a system for migrating data.

With reference to FIG. 2, FIG. 2 is a block diagram of another embodiment of a system 200 for migrating data. At least in the illustrated embodiment, system 200 comprises a computing device 210 coupled to a computing device 220 via a network 230 (e.g., a wide area network, a local area network, the Internet, and the like networks).

Computing device 210, which is similar to system 100 discussed above with reference to FIG. 1, comprises a memory 2110, a SCSI LUN 2120 comprising unprotected data, a SCSI LUN 2130 comprising protected data, and a processor 2140 coupled to one another via a bus 2150 (e.g., a wired and/or wireless bus).

Memory 2110 may be any memory system and/or device capable of storing a PPRC application 2112. PPRC 2112, in one embodiment, is a protocol (e.g., computer-executable code) utilized to mirror a first SCSI LUN (e.g., a source volume) to a second SCSI LUN (e.g., a target volume).

SCSI LUN 2120 may be any memory system and/or block device capable of storing data. In one embodiment, SCSI LUN 2120 comprises unprotected data. In other words, SCSI LUN 2120 is formatted without DIF information (e.g., includes type 0 protection). The unprotected data in SCSI LUN 2120 is capable of being transmitted to SCSI LUN 2130 utilizing PPRC application 2112.

SCSI LUN 2130 may be any memory system and/or device capable of storing data. In one embodiment, SCSI LUN 2130 comprises protected data. In other words, SCSI LUN 2130 is formatted with DIF information (e.g., includes type 1 protection). Data stored in SCSI LUN 2130 includes a data integrity field (DIF) that includes a block CRC, an LBA, and an application-defined application tag. The protected data in SCSI LUN 2130 is capable of being transmitted to SCSI LUN 2120 utilizing PPRC application 2112.

Processor 2140 may be any system, device, and/or device capable of executing PPRC application 2112 in the background to migrate (e.g., mirror) data between SCSI LUN 2120 and SCSI LUN 2130. In one embodiment, processor 2140 is configured to migrate unprotected data from SCSI LUN 2120 to SCSI LUN 2130. Specifically, processor 2140 is configured to utilize PPRC application 2112 to convert the unprotected data to protected data and store the protected data in SCSI LUN 2130. In other words, processor 2140 is configured to utilize PPRC application 2112 to add type 1 protection to the data and store the data with type 1 protection in SCSI LUN 2130.

When migrating data from SCSI LUN 2120 to SCSI LUN 2130, processor 2140 is configured to determine from the SCSI CDB that the data being migrated from SCSI LUN 2120 is not formatted with type 1 protection and that the write command is addressed to a volume that that is formatted with type 1 protection (i.e., SCSI LUN 2130). In response thereto, processor 2140 is configured to generate DIF information on the logical blocks of the data as the blocks are being written into SCSI LUN 2130. The DIF information generated will have good block CRC, a reference tag, and an application tag set to the industry standard "FFFFh."

When type 1 protection with a valid application tag is generated, then the integrity of the data from the time that the DIF information was generated on SCSI LUN 2130 is ensured. When a host reads the data on SCSI LUN 2130, a valid DIF on the logical blocks ensures that the data was not corrupted after the data was written to SCSI LUN 2130.

In an alternative embodiment, processor 2140 is configured to provide an interface that enables a user to select a value to use for the application tag, rather than "FFFFh." An application tag that is not FFFFh indicates that the validity of the DIF should be checked and allows a user to check the validity of the data stored in SCSI LUN 2130. In other words, enabling a user to define and/or select an application tag that is different than FFFFh (i.e., an application tag that is different than the industry standard default application tag), allows the user to check the CRC of the data subsequent to reading the data from SCSI LUN 2130.

In another embodiment, processor 2140 is configured to migrate data from SCSI LUN 2130 (i.e., from a volume formatted with type 1 protection) to SCSI LUN 2120 (i.e., to a volume that does not include type 1 protection). That is, SCSI LUN 2130 has support for the data transformation, while SCSI LUN 2120 does not support the data transformation.

To perform the data migration, processor 2140 is configured to determine if the receiving SCSI LUN (i.e., SCSI LUN 2120) is formatted with DIF information. This determination is made when a relationship between SCSI LUN 2120 and SCSI LUN 2130 is first established. Specifically, SCSI LUN 2130 issues a query to SCSI LUN 2120 to determine the state of SCSI LUN 2120. In response to the query, SCSI LUN 2120 transmits a response that includes a flag that indicates whether SCSI LUN 2120 is formatted with DIF information (i.e., a flag that indicates that SCSI LUN 2120 is not formatted with type 1 protection) and SCSI LUN 2130 stores this information. When data is transferred from SCSI LUN 2130 to SCSI LUN 2120, processor 2140 is configured to strip the type 1 protection from the logical blocks being transmitted from SCSI LUN 2130 to SCSI LUN 2120 prior to transmitting the data to SCSI LUN 2120.

The following sequence is illustrative of the operation of this embodiment of computing device 210. Initially, processor 2140 determines that it is necessary to issue a command to write data from SCSI LUN 2130 to SCSI LUN 2120. Processor 2140 then determines that SCSI LUN 2130 is formatted with type 1 protection and that SCSI LUN 2120 is not formatted with type 1 protection. Processor 2140 is then configured to strip the type 1 protection from the logical blocks and then transfer the logical blocks to SCSI LUN 2120. Furthermore, processor 2140 then strips the DIF from the blocks as processor 2140 reads the data from SCSI LUN 2130 and then sends a SCSI write command with the data to SCSI LUN 2120.

Computing device 220, which is similar to system 100 discussed above with reference to FIG. 1, comprises a memory 2210, a SCSI LUN 2220 comprising unprotected data, a SCSI LUN 2230 comprising protected data, and a processor 2240 coupled to one another via a bus 2250 (e.g., a wired and/or wireless bus).

Memory 2210 may be any memory system and/or device capable of storing a PPRC application 2212. PPRC 2212, in one embodiment, is a protocol (e.g., computer-executable code) utilized to mirror a first SCSI LUN (e.g., a source volume) to a second SCSI LUN (e.g., a target volume).

SCSI LUN 2220 may be any memory system and/or block device capable of storing data. In one embodiment, SCSI LUN 2220 comprises unprotected data. In other words, SCSI LUN 2220 is formatted without DIF information (e.g., includes type 0 protection). The unprotected data in SCSI LUN 2220 is capable of being transmitted to SCSI LUN 2230 utilizing PPRC application 2212.

SCSI LUN 2230 may be any memory system and/or device capable of storing data. In one embodiment, SCSI LUN 2230 comprises protected data. In other words, SCSI LUN 2230 is formatted with DIF information (e.g., includes type 1 protection). Data stored in SCSI LUN 2230 includes a data integrity field (DIF) that includes a block CRC, an LBA, and an application-defined application tag. The protected data in SCSI LUN 2230 is capable of being transmitted to SCSI LUN 2220 utilizing PPRC application 2212.

Processor 2240 may be any system, device, and/or device capable of executing PPRC application 2212 in the background to migrate (e.g., mirror) data between SCSI LUN 2220 and SCSI LUN 2230. In one embodiment, processor 2240 is configured to migrate unprotected data from SCSI LUN 2220 to SCSI LUN 2230. Specifically, processor 2240 is configured to utilize PPRC application 2212 to convert the unprotected data to protected data and store the protected data in SCSI LUN 2230. In other words, processor 2240 is configured to utilize PPRC application 2212 to add type 1 protection to the data and store the data with type 1 protection in SCSI LUN 2230.

When migrating data from SCSI LUN 2220 to SCSI LUN 2230, processor 2240 is configured to determine from the SCSI CDB that the data being migrated from SCSI LUN 2220 is not formatted with type 1 protection and that the write command is addressed to a volume that that is formatted with type 1 protection (i.e., SCSI LUN 2230). In response thereto, processor 2240 is configured to generate DIF information on the logical blocks of the data as the blocks are being written into SCSI LUN 2230. The DIF information generated will have good block CRC, a reference tag, and an application tag set to the industry standard "FFFFh."

When type 1 protection with a valid application tag is generated, then the integrity of the data from the time that the DIF information was generated on SCSI LUN 2230 is ensured. When a host reads the data on SCSI LUN 2230, a valid DIF on the logical blocks ensures that the data was not corrupted after the data was written to SCSI LUN 2230.

In an alternative embodiment, processor 2240 is configured to provide an interface that enables a user to select a value to use for the application tag, rather than "FFFFh." An application tag that is not FFFFh indicates that the validity of the DIF should be checked and allows a user to check the validity of the data stored in SCSI LUN 2230. In other words, enabling a user to define and/or select an application tag that is different than FFFFh (i.e., an application tag that is different than the industry standard default application tag), allows the user to check the CRC of the data subsequent to reading the data from SCSI LUN 2230.

In another embodiment, processor 2240 is configured to migrate data from SCSI LUN 2230 (i.e., from a volume formatted with type 1 protection) to SCSI LUN 2220 (i.e., to a volume that does not include type 1 protection). That is, SCSI LUN 2230 has support for the data transformation, while SCSI LUN 2220 does not support the data transformation.

To perform the data migration, processor 2240 is configured to determine if the receiving SCSI LUN (i.e., SCSI LUN 2220) is formatted with DIF information. This determination is made when a relationship between SCSI LUN 2220 and SCSI LUN 2230 is first established. Specifically, SCSI LUN 2230 issues a query to SCSI LUN 2220 to determine the state of SCSI LUN 2220. In response to the query, SCSI LUN 2220 transmits a response that includes a flag that indicates whether SCSI LUN 2220 is formatted with DIF information (i.e., a flag that indicates that SCSI LUN 2220 is not formatted with type 1 protection) and SCSI LUN 2230 stores this information. When data is transferred from SCSI LUN 2230 to SCSI LUN 2220, processor 2240 is configured to strip the type 1 protection from the logical blocks being transmitted from SCSI LUN 2230 to SCSI LUN 2220 prior to transmitting the data to SCSI LUN 2220.

The following sequence is illustrative of the operation of this embodiment of computing device 220. Initially, processor 2240 determines that it is necessary to issue a command to write data from SCSI LUN 2230 to SCSI LUN 2220. Processor 2240 then determines that SCSI LUN 2230 is formatted with type 1 protection and that SCSI LUN 2220 is not formatted with type 1 protection. Processor 2240 is then configured to strip the type 1 protection from the logical blocks and then transfer the logical blocks to SCSI LUN 2220. Furthermore, processor 2240 then strips the DIF from the blocks as processor 2240 reads the data from SCSI LUN 2230 and then sends a SCSI write command with the data to SCSI LUN 2220.

In addition, system 200 is capable of migrating data between computing device 210 and computing device 220. Specifically, system 200 is capable of migrating unprotected data from SCSI LUN 2120 to SCSI LUN 2230 and from SCSI LUN 2220 to SCSI LUN 2130. Furthermore, system 200 is capable of migrating protected data from SCSI LUN 2130 to SCSI LUN 2220 and from SCSI LUN 2230 to SCSI LUN 2120.

With additional reference to processor 2140, processor 2140 is further configured to execute PPRC application 2112 to migrate (e.g., mirror) data between SCSI LUN 2220 and SCSI LUN 2130. In one embodiment, processor 2140 is configured to migrate unprotected data from SCSI LUN 2220 to SCSI LUN 2130. Specifically, processor 2140 is configured to utilize PPRC application 2112 to convert the unprotected data to protected data and store the protected data in SCSI LUN 2130. In other words, processor 2140 is configured to utilize PPRC application 2112 to add type 1 protection to the data stored in SCSI LUN 2220 and store the data with type 1 protection in SCSI LUN 2130.

When migrating data from SCSI LUN 2220 to SCSI LUN 2130, processor 2140 is configured to determine from the SCSI CDB that the data being migrated from SCSI LUN 2220 is not formatted with type 1 protection and that the write command is addressed to a volume that that is formatted with type 1 protection (i.e., SCSI LUN 2130). In response thereto, processor 2140 is configured to generate DIF information on the logical blocks of the data as the blocks are being written into SCSI LUN 2130. The DIF information generated will have good block CRC, a reference tag, and an application tag set to the industry standard "FFFFh."

When type 1 protection with a valid application tag is generated, then the integrity of the data from the time that the DIF information was generated on SCSI LUN 2130 is ensured. When a host reads the data on SCSI LUN 2130, a valid DIF on the logical blocks ensures that the data was not corrupted after the data was written to SCSI LUN 2130.

In an alternative embodiment, processor 2140 is configured to provide an interface that enables a user to select a value to use for the application tag, rather than "FFFFh." An application tag that is not FFFFh indicates that the validity of the DIF should be checked and allows a user to check the validity of the data stored in SCSI LUN 2130. In other words, enabling a user to define and/or select an application tag that is different than FFFFh (i.e., an application tag that is different than the industry standard default application tag), allows the user to check the CRC of the data subsequent to reading the data from SCSI LUN 2130.

In another embodiment, processor 2140 is further configured to migrate data from SCSI LUN 2130 (i.e., from a volume formatted with type 1 protection) to SCSI LUN 2220 (i.e., to a volume that does not include type 1 protection). That is, SCSI LUN 2130 has support for the data transformation, while SCSI LUN 2220 does not support the data transformation.

To perform the data migration, processor 2140 is configured to determine if the receiving SCSI LUN (i.e., SCSI LUN 2220) is formatted with DIF information. This determination is made when a relationship between SCSI LUN 2220 and SCSI LUN 2130 is first established. Specifically, processor 2140 issues a query to SCSI LUN 2220 to determine the state of SCSI LUN 2220. In response to the query, SCSI LUN 2220 transmits a response that includes a flag that indicates whether SCSI LUN 2220 is formatted with DIF information (i.e., a flag that indicates that SCSI LUN 2220 is not formatted with type 1 protection) and SCSI LUN 2130 stores this information. When data is transferred from SCSI LUN 2130 to SCSI LUN 2220, processor 2140 is configured to strip the type 1 protection from the logical blocks being transmitted from SCSI LUN 2130 to SCSI LUN 2220 prior to transmitting the data to SCSI LUN 2220.

The following sequence is illustrative of the operation of this embodiment of processor 2140. Initially, processor 2140 determines that it is necessary to issue a command to write data from SCSI LUN 2130 to SCSI LUN 2220. Processor 2140 then determines that SCSI LUN 2130 is formatted with type 1 protection and that SCSI LUN 2220 is not formatted with type 1 protection. Processor 2140 is then configured to strip the type 1 protection from the logical blocks and then transfer the logical blocks to SCSI LUN 2220. Furthermore, processor 2140 then strips the DIF from the blocks as processor 2140 reads the data from SCSI LUN 2130 and then sends a SCSI write command with the data to SCSI LUN 2220.

With reference to an additional embodiment of processor 2240, processor 2240 is further configured to execute PPRC application 2212 to migrate (e.g., mirror) data between SCSI LUN 2220 and SCSI LUN 2230. In one embodiment, processor 2240 is configured to migrate unprotected data from SCSI LUN 2120 to SCSI LUN 2230. Specifically, processor 2240 is configured to utilize PPRC application 2212 to convert the unprotected data to protected data and store the protected data in SCSI LUN 2230. In other words, processor 2240 is configured to utilize PPRC application 2212 to add type 1 protection to the data stored in SCSI LUN 2220 and store the data with type 1 protection in SCSI LUN 2230.

When migrating data from SCSI LUN 2120 to SCSI LUN 2230, processor 2240 is configured to determine from the SCSI CDB that the data being migrated from SCSI LUN 2120 is not formatted with type 1 protection and that the write command is addressed to a volume that that is formatted with type 1 protection (i.e., SCSI LUN 2230). In response thereto, processor 2240 is configured to generate DIF information on the logical blocks of the data as the blocks are being written into SCSI LUN 2230. The DIF information generated will have good block CRC, a reference tag, and an application tag set to the industry standard "FFFFh."

When type 1 protection with a valid application tag is generated, then the integrity of the data from the time that the DIF information was generated on SCSI LUN 2230 is ensured. When a host reads the data on SCSI LUN 2230, a valid DIF on the logical blocks ensures that the data was not corrupted after the data was written to SCSI LUN 2230.

In an alternative embodiment, processor 2240 is configured to provide an interface that enables a user to select a value to use for the application tag, rather than "FFFFh." An application tag that is not FFFFh indicates that the validity of the DIF should be checked and allows a user to check the validity of the data stored in SCSI LUN 2230. In other words, enabling a user to define and/or select an application tag that is different than FFFFh (i.e., an application tag that is different than the industry standard default application tag), allows the user to check the CRC of the data subsequent to migrating reading the data from SCSI LUN 2230.

In another embodiment, processor 2240 is further configured to migrate data from SCSI LUN 2230 (i.e., from a volume formatted with type 1 protection) to SCSI LUN 2220 (i.e., to a volume that does not include type 1 protection). That is, SCSI LUN 2230 has support for the data transformation, while SCSI LUN 2120 does not support the data transformation.

To perform the data migration, processor 2240 is configured to determine if the receiving SCSI LUN (i.e., SCSI LUN 2120) is formatted with DIF information. This determination is made when a relationship between SCSI LUN 2120 and SCSI LUN 2230 is first established. Specifically, processor 2240 issues a query to SCSI LUN 2120 to determine the state of SCSI LUN 2220. In response to the query, SCSI LUN 2220 transmits a response that includes a flag that indicates whether SCSI LUN 2120 is formatted with DIF information (i.e., a flag that indicates that SCSI LUN 2120 is not formatted with type 1 protection) and SCSI LUN 2230 stores this information. When data is transferred from SCSI LUN 2230 to SCSI LUN 2120, processor 2240 is configured to strip the type 1 protection from the logical blocks being transmitted from SCSI LUN 2230 to SCSI LUN 2120 prior to transmitting the data to SCSI LUN 2120.

The following sequence is illustrative of the operation of this embodiment of processor 2240. Initially, processor 2240 determines that it is necessary to issue a command to write data from SCSI LUN 2230 to SCSI LUN 2120. Processor 2240 then determines that SCSI LUN 2230 is formatted with type 1 protection and that SCSI LUN 2120 is not formatted with type 1 protection. Processor 2240 is then configured to strip the type 1 protection from the logical blocks and then transfer the logical blocks to SCSI LUN 2120. Furthermore, processor 2240 then strips the DIF from the blocks as processor 2240 reads the data from SCSI LUN 2230 and then sends a SCSI write command with the data to SCSI LUN 2120.

Although FIG. 2 illustrates computing device 210 as comprising one unprotected SCSI LUN (e.g., SCSI LUN 2120) and one protected SCSI LUN (SCSI LUN 2130), computing device 210 is not limited to such. That is, various embodiments of computing device 210 may include more than one unprotected SCSI LUN (e.g., SCSI LUN 2120) and/or more than one protected SCSI LUN (SCSI LUN 2130) and function similar to the illustrated embodiment of computing device 210.

In addition, Although FIG. 2 illustrates computing device 220 as comprising one unprotected SCSI LUN (e.g., SCSI LUN 2220) and one protected SCSI LUN (SCSI LUN 2230), computing device 220 is not limited to such. That is, various embodiments of computing device 220 may include more than one unprotected SCSI LUN (e.g., SCSI LUN 2220) and/or more than one protected SCSI LUN (SCSI LUN 2230) and function similar to the illustrated embodiment of computing device 220 as well as how computing device 220 operates in conjunction with computing device 210.

Figure 3:
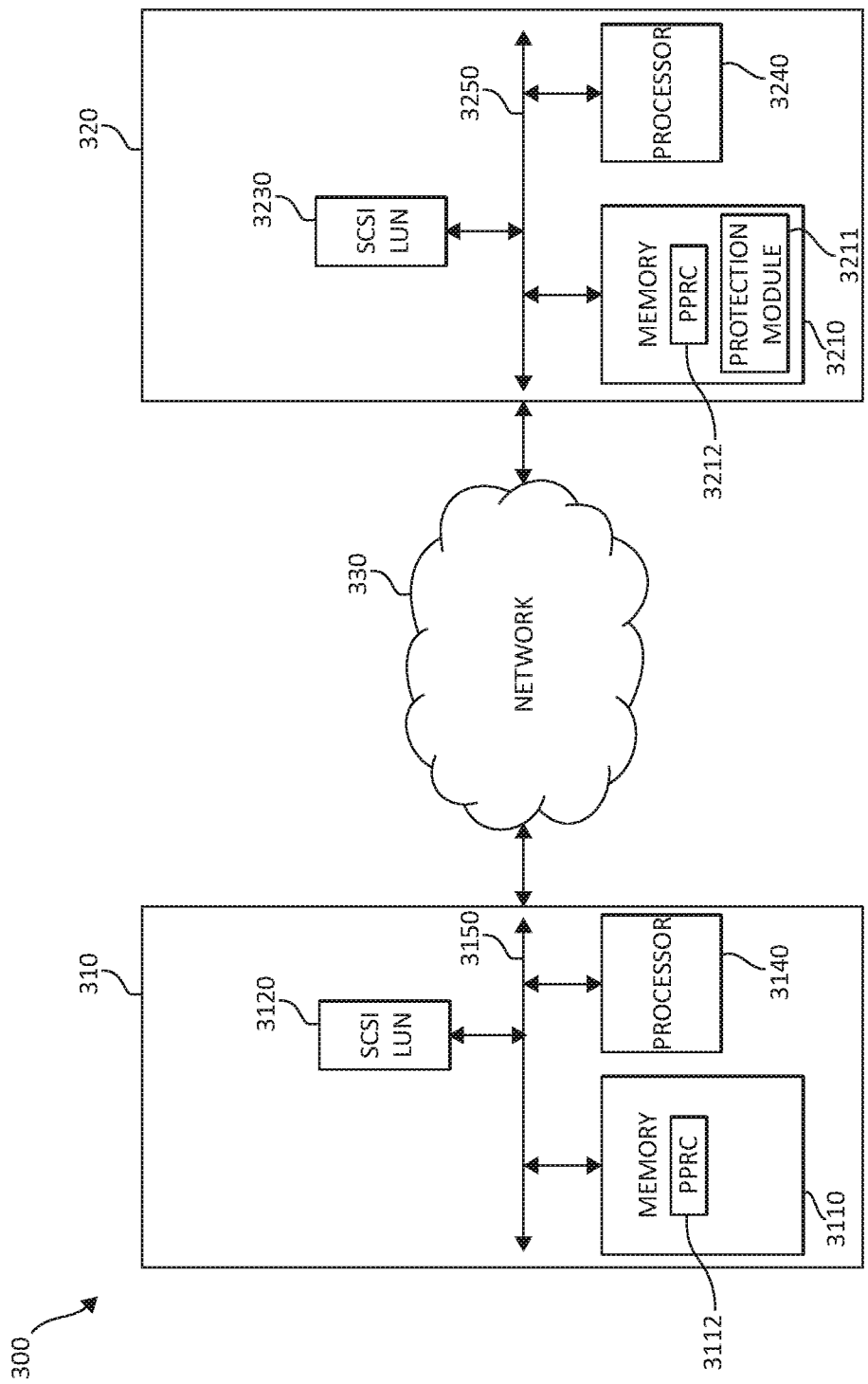
FIG. 3 is a block diagram of yet another embodiment of a system for migrating data.

With reference to FIG. 3, FIG. 3 is a block diagram of another embodiment of a system 300 for migrating data. At least in the illustrated embodiment, system 300 comprises a computing device 310 coupled to a computing device 320 via a network 330 (e.g., a wide area network, a local area network, the Internet, and the like networks).

Computing device 310 comprises a memory 3110, a SCSI LUN 3120 comprising unprotected data, and a processor 3140 coupled to one another via a bus 3150 (e.g., a wired and/or wireless bus). Memory 3110 may be any memory system and/or device capable of storing a peer-to-peer remote copy (PPRC) application 3112. PPRC 3112, in one embodiment, is a protocol (e.g., computer-executable code) utilized to migrate (or mirror) unprotected data stored in SCSI LUN 3120 (e.g., a source volume) to a SCSI LUN 3230 (e.g., a target volume). Furthermore, PPRC 3212, when executed by processor 3140, is configured to receive unprotected data from SCSI LUN 3230 and store the unprotected data in SCSI LUN 3120.

SCSI LUN 3120 may be any memory system and/or block device capable of storing data. In one embodiment, SCSI LUN 3120 comprises unprotected data. In other words, SCSI LUN 3120 is formatted without DIF information (e.g., includes type 0 protection). The unprotected data in SCSI LUN 3120 is capable of being transmitted to computing device 320 and data from computing device 320 is capable of being transmitted to SCSI LUN 3120.

Processor 3140 may be any system, device, and/or device capable of communicating with and executing PPRC 3112 to migrate (e.g., mirror) data between computing device 310 and computing device 320. Specifically, processor 3140 is configured to transmit unprotected data from SCSI LUN 3120 to computing device 320 and receive unprotected data from computing device 320 for storage in SCSI LUN 3120.

Computing device 320 comprises a memory 3210, a SCSI LUN 3230 comprising protected data (e.g., data with DIF information), and a processor 3240 coupled to one another via a bus 3250 (e.g., a wired and/or wireless bus). Memory 3210 may be any memory system and/or device capable of storing a protection module 3211 (e.g., an application, computer-executable code, and/or a computer program) capable of adding type 1 protection to unprotected data (e.g., data including type 0 protection or data without DIF information) and a PPRC 3212.

SCSI LUN 3230 may be any memory system and/or device capable of storing data. In one embodiment, SCSI LUN 3230 comprises protected data. In other words, SCSI LUN 3230 is formatted with DIF information (e.g., includes type 1 protection). Data stored in SCSI LUN 3230 includes a data integrity field (DIF) that includes a block CRC, an LBA, and an application-defined application tag. The protected data in SCSI LUN 3230 is capable of being transmitted to SCSI LUN 3220 utilizing PPRC application 3212.

Processor 3240 may be any system, device, and/or device capable of executing protection module 3211 and PPRC application 3212 in the background to migrate (e.g., mirror) data between SCSI LUN 3230 and SCSI LUN 3120. In one embodiment, processor 3240 is configured to migrate unprotected data from SCSI LUN 3120 to SCSI LUN 3230. Specifically, processor 3240 is configured to utilize protection module 3211 to convert the unprotected data to protected data and store the protected data in SCSI LUN 3230. In other words, processor 3240 is configured to utilize protection module 3211 to add type 1 protection to the unprotected data and store the data with type 1 protection in SCSI LUN 3230.

When migrating data from SCSI LUN 3120 to SCSI LUN 3230 utilizing protection module 3211, processor 3240 is configured to determine from the SCSI CDB that the data being migrated from SCSI LUN 3120 is not formatted with type 1 protection and that the write command is addressed to a volume that that is formatted with type 1 protection (i.e., SCSI LUN 3230). In response thereto, processor 3240 is configured to generate DIF information on the logical blocks of the data as the blocks are being written into SCSI LUN 3230. The DIF information generated will have a good block CRC, a reference tag, and an application tag set to the industry standard "FFFFh."

When type 1 protection with a valid application tag is generated, the integrity of the data from the time that the DIF information was generated on SCSI LUN 3230 is ensured. In other words, when a host reads the data on SCSI LUN 3230, a valid DIF on the logical blocks ensures that the data was not corrupted after the data was written to SCSI LUN 3230.

In an alternative embodiment, processor 3240 is configured to provide an interface that enables a user to select a value to use for the application tag, rather than "FFFFh." An application tag that is not FFFFh indicates that the validity of the DIF should be checked and allows a user to check the validity of the data stored in SCSI LUN 3230. In other words, enabling a user to define and/or select an application tag that is different than FFFFh (i.e., an application tag that is different than the industry standard default application tag), allows the user to check the CRC of the data subsequent to reading the data from SCSI LUN 3230.

In another embodiment, processor 3240 is configured to utilize PPRCE 3212 to migrate data from SCSI LUN 3230 (i.e., from a volume formatted with type 1 protection) to SCSI LUN 3120 (i.e., to a volume that does not include type 1 protection). That is, SCSI LUN 3230 has support for the data transformation, while SCSI LUN 3120 does not support the data transformation.

To perform the data migration, processor 3240 is configured to determine if the receiving SCSI LUN (i.e., SCSI LUN 3120) is formatted with DIF information. This determination is made when a relationship between SCSI LUN 3120 and SCSI LUN 3230 is first established. Specifically, processor 3240 issues a query to SCSI LUN 3120 to determine the state of SCSI LUN 3120. In response to the query, SCSI LUN 3120 transmits a response that includes a flag that indicates whether SCSI LUN 3120 is formatted with DIF information (i.e., a flag that indicates that SCSI LUN 3120 is not formatted with type 1 protection) and processor 3240 stores this information. When data is transferred from SCSI LUN 3230 to SCSI LUN 3120, processor 3240 is configured to strip the type 1 protection from the logical blocks being transmitted from SCSI LUN 3230 to SCSI LUN 3120 prior to transmitting the data to SCSI LUN 3120 and utilize PPRC 3212 to migrate the data to SCSI LUN 3120.

The following sequence is illustrative of the operation of this embodiment of system 300. Initially, processor 3240 determines that it is necessary to issue a command to write data from SCSI LUN 3230 to SCSI LUN 3120. Processor 3240 then determines that SCSI LUN 3230 is formatted with type 1 protection and that SCSI LUN 3120 is not formatted with type 1 protection. Processor 3240 is then configured to strip the type 1 protection from the logical blocks and then transfer the logical blocks to SCSI LUN 3120. Furthermore, processor 3240 then strips the DIF from the blocks as processor 3240 reads the data from SCSI LUN 3230 and then utilizes PPRC 3212 to send a SCSI write command with the now unprotected data to SCSI LUN 3120.

Although FIG. 3 illustrates computing device 310 as comprising one unprotected SCSI LUN (e.g., SCSI LUN 3120), computing device 310 is not limited to such. That is, various embodiments of computing device 310 may include more than one unprotected SCSI LUN (e.g., SCSI LUN 3120) and function similar to the illustrated embodiment of computing device 310.

Although FIG. 3 illustrates computing device 320 as comprising one protected SCSI LUN (SCSI LUN 3230), computing device 320 is not limited to such. That is, various embodiments of computing device 320 may include more than one protected SCSI LUN (SCSI LUN 3230) and function similar to the illustrated embodiment of computing device 320 as well as how computing device 320 operates in conjunction with computing device 310.

Figure 4:
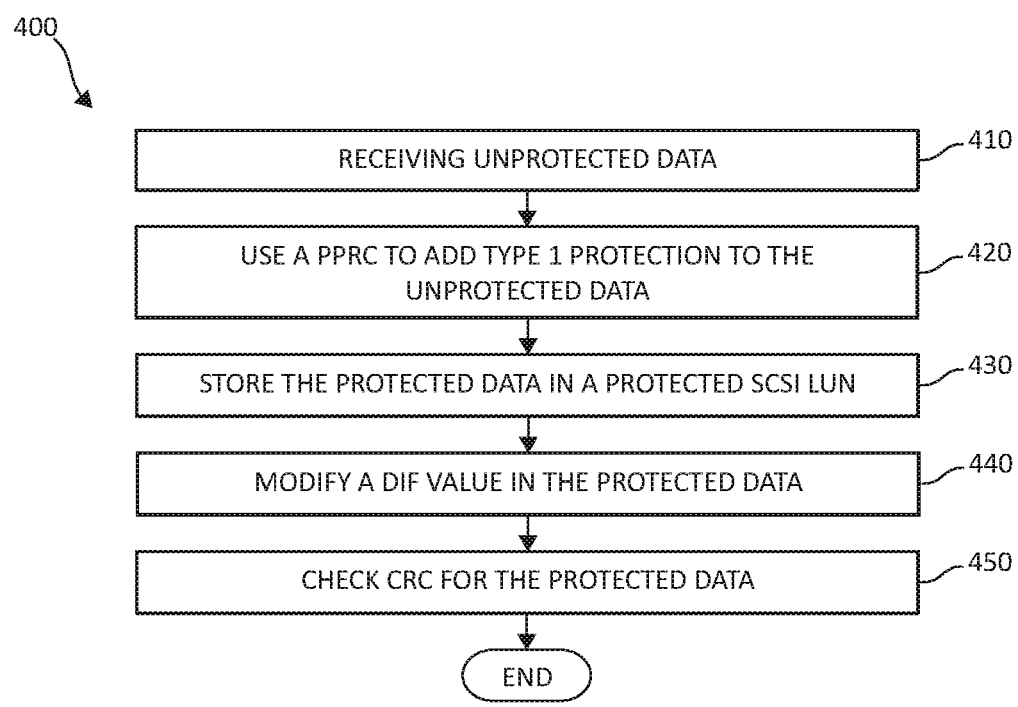
FIG. 4 is a flow diagram of one embodiment of a method for migrating unprotected data from an unprotected SCSI LUN to a protected SCSI LUN.

With reference now to FIG. 4, FIG. 4 is a flow diagram of one embodiment of one embodiment of a method 400 for migrating unprotected data from an unprotected SCSI LUN (e.g., SCSI LUN 120, SCSI LUN 2120, SCSI LUN 2220, and SCSI LUN 3120) to a protected SCSI LUN (e.g., SCSI LUN 130, SCSI LUN 2130, SCSI LUN 2230, and SCSI LUN 3230). At least in the illustrated embodiment, method 400 begins by receiving, from the unprotected SCSI LUN, data with type 0 protection (i.e., unprotected data) (block 410).

Method 400 further comprises utilizing, by the protected SCSI LUN, a PPRC application to add type 1 protection to the data to generate protected data (block 420) and storing the protected data in the protected SCSI LUN (block 430). The protected SCSI LUN executes the PPRC in the background so that other functions of, for example, system 100, system 200, and system 300 may be performed in the foreground.

In one embodiment, the protected SCSI LUN and the unprotected SCSI LUN comprised within a same computing device (see e.g., system 100 in FIG. 1). In another embodiment, the protected SCSI LUN and the unprotected SCSI LUN are comprised within different computing devices (see e.g., system 200 in FIG. 2 and system 300 in FIG. 3).

In various embodiments, modifying a value in the application tag such that the value is different than an industry standard default value for protected data (block 440). That is, method 400 further comprises adding the type 1 DIF information (see block 420) with an application tag of FFFFh when a user-defined value is not set or generating and adding valid type 1 DIF information using a user-defined application tag value if the application tag value was set by a user.

Method 400 further comprises checking a CRC for the protected data when a request to read and/or migrate the protected data is received (block 450). That is, the CRC is checked when the application tag value is a value other than FFFFh to ensure the integrity of the data in the protected SCSI LUN.

Figure 5:
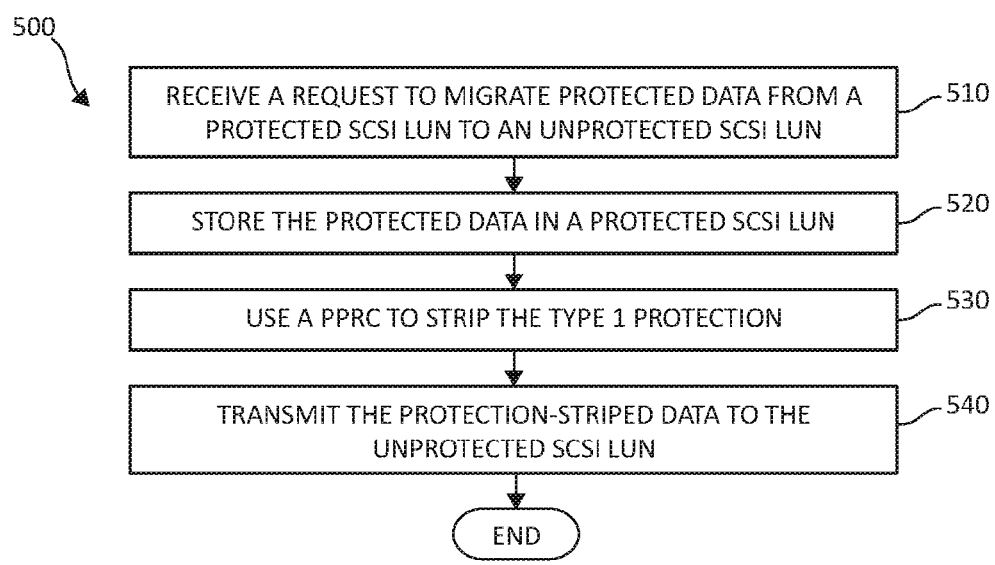
FIG. 5 is a flow diagram of an embodiment of a method for migrating protected data from a protected SCSI LUN to an unprotected SCSI LUN.

Referring now to FIG. 5, FIG. 5 is a flow diagram of one embodiment of a method 500 for migrating protected data from a protected SCSI LUN (e.g., SCSI LUN 130, SCSI LUN 2130, SCSI LUN 2230, and SCSI LUN 3230) to an unprotected SCSI LUN (e.g., SCSI LUN 120, SCSI LUN 2120, SCSI LUN 2220, and SCSI LUN 3220). At least in the illustrated embodiment, method 500 begins by receiving, at the protected SCSI LUN, a request to transmit the protected data (block 510).

In one embodiment, method 500 further comprises checking a CRC for the protected data in response to receiving the request (block 520). The CRC is checked to determine if the protection data is valid when the DIF includes a value other than FFFFh.

Method 500 further comprises utilizing, by a processor, a PPRC application to strip the protection from the protected data (block 530) and transmit the unprotected data to the unprotected SCSI LUN (block 540). In one embodiment, the protected SCSI LUN and the unprotected SCSI LUN are comprised within the same computing device (e.g., system 100 in FIG. 1. In another embodiment, the protected SCSI LUN and the unprotected SCSI LUN are comprised within different computing devices (see system 200 in FIG. 2 and system 300 in FIG. 3).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A computer program product for migrating unprotected data to a protected small computer system interface logical unit number (SCSI LUN) in a computing storage environment, by a processor device, the computer program product embodied on a non-transitory computer-readable storage medium having computer-readable program code stored therein, the computer-readable program code executing the steps of:
   receiving, from a first processor, data that is unprotected comprising a data integrity field;
   utilizing, by a second processor, a peer-to-peer remote copy (PPRC) application to add protection to the data to generate protected data; and
   subsequent to adding the protection, modifying a value in the data integrity field such that the value is different than an industry standard default value for protected data subsequent to adding the protection.

2. The computer program product of claim 1, further comprising the steps of:
   checking a CRC for the protected data when a request to migrate the protected data is received; and
   storing the protected data in the protected SCSI LUN.

3. The computer program product of claim 1, wherein receiving comprises receiving the unprotected data from an unprotected SCSI LUN, the protected SCSI LUN and the unprotected SCSI LUN comprised within a same computing device.

4. The computer program product of claim 3, wherein receiving comprises receiving the unprotected data from an unprotected SCSI LUN, the protected SCSI LUN and the unprotected SCSI LUN comprised within different computing devices.

5. The computer program product of claim 1, wherein utilizing the PPRC comprises executing the PPRC in the background to add the protection to the unprotected data.

6. A method for migrating unprotected data to a protected small computer system interface logical unit number (SCSI LUN) in a computing storage environment, by a processor device, the method comprising:
   receiving, from a first processor, data that is unprotected comprising a data integrity field;
   utilizing, by a second processor, a peer-to-peer remote copy (PPRC) application to add protection to the data to generate protected data; and
   subsequent to adding the protection, modifying a value in the data integrity field such that the value is different than an industry standard default value for protected data subsequent to adding the protection.

7. The method of claim 6, further comprising the steps of:
   checking a CRC for the protected data when a request to migrate the protected data is received; and
   storing the protected data in the protected SCSI LUN.

8. The method of claim 6, wherein receiving comprises receiving the unprotected data from an unprotected SCSI LUN, the protected SCSI LUN and the unprotected SCSI LUN comprised within a same computing device.

9. The method of claim 8, wherein receiving comprises receiving the unprotected data from an unprotected SCSI LUN, the protected SCSI LUN and the unprotected SCSI LUN comprised within different computing devices.

10. The method of claim 6, wherein utilizing the PPRC comprises executing the PPRC in the background to add the protection to the unprotected data.

* * * * *